United States Patent
Davidson

(10) Patent No.: US 6,254,788 B1
(45) Date of Patent: Jul. 3, 2001

(54) METHOD OF SANITIZING WATER IN A BATHING POOL

(75) Inventor: Donald R. Davidson, Chatham, NJ (US)

(73) Assignee: H-Tech, Inc., Wilmington, DE (US)

( * ) Notice: Subject to any disclaimer, the term of this patent is extended or adjusted under 35 U.S.C. 154(b) by 0 days.

(21) Appl. No.: 09/428,418

(22) Filed: Oct. 28, 1999

Related U.S. Application Data

(62) Division of application No. 09/014,448, filed on Jan. 28, 1998, now Pat. No. 6,004,458.
(60) Provisional application No. 60/036,970, filed on Jan. 29, 1997.

(51) Int. Cl.[7] .............................. B01D 37/00; C02F 1/68
(52) U.S. Cl. ......................... 210/764; 210/765; 210/805
(58) Field of Search .................................. 210/764, 767, 210/169, 206, 765, 805

(56) References Cited

U.S. PATENT DOCUMENTS

| 3,899,425 | 8/1975 | Lewis . |
| 4,092,245 | 5/1978 | Franks . |
| 4,347,136 | 8/1982 | Friesen et al. . |
| 4,416,854 | 11/1983 | Nielsen . |
| 4,504,387 | 3/1985 | LeMire et al. . |
| 4,780,197 | 10/1988 | Schuman . |
| 4,971,687 | 11/1990 | Anderson . |
| 5,076,315 | 12/1991 | King . |
| 5,078,876 | 1/1992 | Whittier et al. . |
| 5,171,442 | 12/1992 | Nakshbendi . |
| 5,190,648 | 3/1993 | Ramsauer . |
| 5,218,983 | 6/1993 | King . |
| 5,236,581 | 8/1993 | Perry . |
| 5,277,802 | 1/1994 | Goodwin . |
| 5,279,748 | 1/1994 | Hackett . |
| 5,656,159 | 8/1997 | Spencer et al. . |
| 5,772,896 | 6/1998 | Denkewicz, Jr. et al. . |
| 5,810,999 | 9/1998 | Bachand et al. . |
| 5,935,609 | 8/1999 | Denkewicz, Jr. et al. . |
| 5,976,385 | 11/1999 | King . |

OTHER PUBLICATIONS

"The Natural Spa Purifier" advertisement, for Fountainhead Technologies'Nature[2] device, undated.

Primary Examiner—Matthew O. Savage
(74) Attorney, Agent, or Firm—Selitto, Behr & Kim

(57) ABSTRACT

A filter/sanitizer has a filter housing, provided with a fluid inlet and a fluid outlet, a filter cartridge with a hollow interior, located within the filter housing, and a sanitizer cartridge, with a hollow core, positioned within the hollow interior of the filter cartridge. In a preferred embodiment, the sanitizer cartridge is constructed with an outer fluid-permeable member and an inner fluid-permeable member, the outer and inner members substantially enveloping a space therebetween, with the space containing a sanitizing media bed. In operation, as fluid enters the filter housing through the fluid inlet, substantially the full flow of fluid passes through the filter cartridge, through the sanitizer cartridge and around the sanitizing media contained within the bed, into the hollow core of the sanitizer cartridge, and out of the filter housing through the fluid outlet.

3 Claims, 12 Drawing Sheets

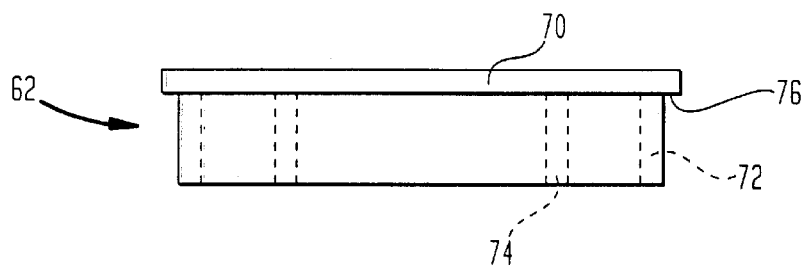
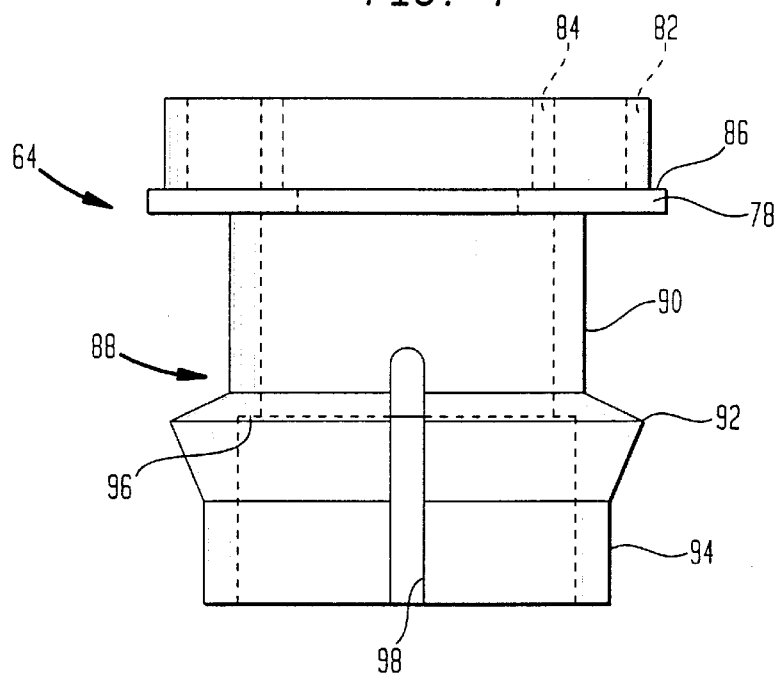
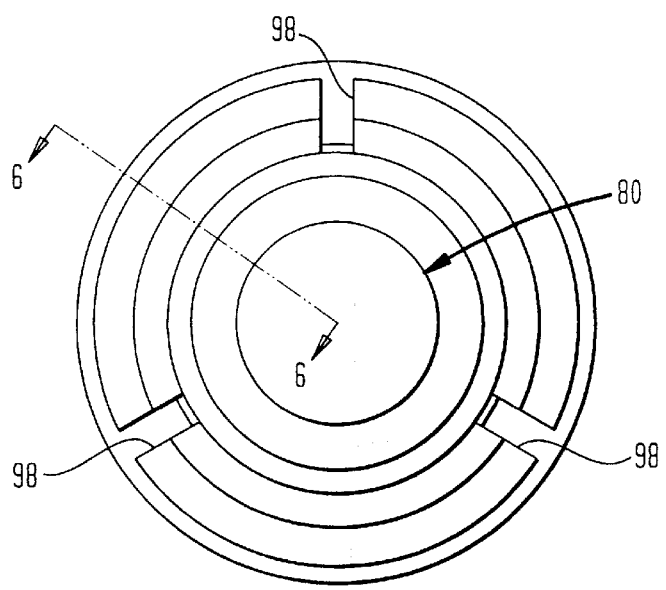

METHOD OF SANITIZING WATER IN A BATHING POOL

CROSS REFERENCE TO RELATED APPLICATIONS

This is a divisional of U.S. application Ser. No. 09/014,448 filed Jan. 28,1998, now U.S. Pat. No. 6,004,458, which is a 111 (a) application relating to U.S. application Ser. No. 60/036,970 filed Jan. 29, 1997.

FIELD OF THE INVENTION

The present invention relates to a device and method for filtering and chemical treatment of fluid within a cartridge-type filter.

BACKGROUND OF THE INVENTION

Cartridge-type filters for swimming pools, hot tubs, spas and the like are well known in the art. Chemical treatment of pool water with sanitizing media such as bactericides, germicides or algaecides is also known in the art. Combinations of cartridge-type filters and chemical treatment are limited in the art.

U.S. Pat. No. 4,780,197 combines a cartridge filter with a chlorination module, but only a partial flow is directly in contact with the chemical treatment media. Even the insertion of a "tea bag" type apparatus filled with sanitizing media, as disclosed in U.S. Pat. No. 4,416,854, into the interior of a cartridge-type filter would not insure contact of the full flow through the filter with the sanitizing media. A need exists for a combination of a cartridge-type filter and sanitizing treatment, whereby the full system flow through the filter is directly in contact with the sanitizing media.

SUMMARY OF THE INVENTION

A cartridge-type filter is combined with a sanitizer cartridge (i.e., a canister) in a filter/sanitizer to both filter and chemically treat the full flow of water through the apparatus. The sanitizer cartridge may be adapted to a wide range of conventional cartridge-type filters and a wide range of sanitizing media, such as bactericides, germicides and algaecides, as well as an equally wide range of water treatment media.

A sanitizer cartridge includes an outer perforated tube and an inner perforated tube suspended between an end cap and an outlet fitting. The annular space between the inner and outer perforated tubes is filled with sanitizing media. The sanitizer cartridge is positioned within the hollow center of a conventional filter cartridge in a cartridge-type filter such that the outlet fitting is removably and sealingly connected to the filter outlet.

Substantially the full flow through the filter cartridge flows directly through the sanitizing media in the sanitizer cartridge. Therefore, virtually all the water is both filtered and sanitized by the filter/sanitizer.

BRIEF DESCRIPTION OF THE DRAWINGS

For a better understanding of the present invention, reference is made to the following detailed description of an exemplary embodiment considered in conjunction with the accompanying drawings, in which:

FIG. 3 is an elevation of the sanitizer cartridge end cap for the filter/sanitizer shown in FIG. 1;

FIG. 4 is an elevation of the sanitizer cartridge outlet fitting for the filter/sanitizer shown in FIG. 1;

FIG. 5 is a bottom plan view of the sanitizer cartridge outlet fitting shown in FIG. 6;

DETAILED DESCRIPTION OF THE INVENTION

Figure 1:
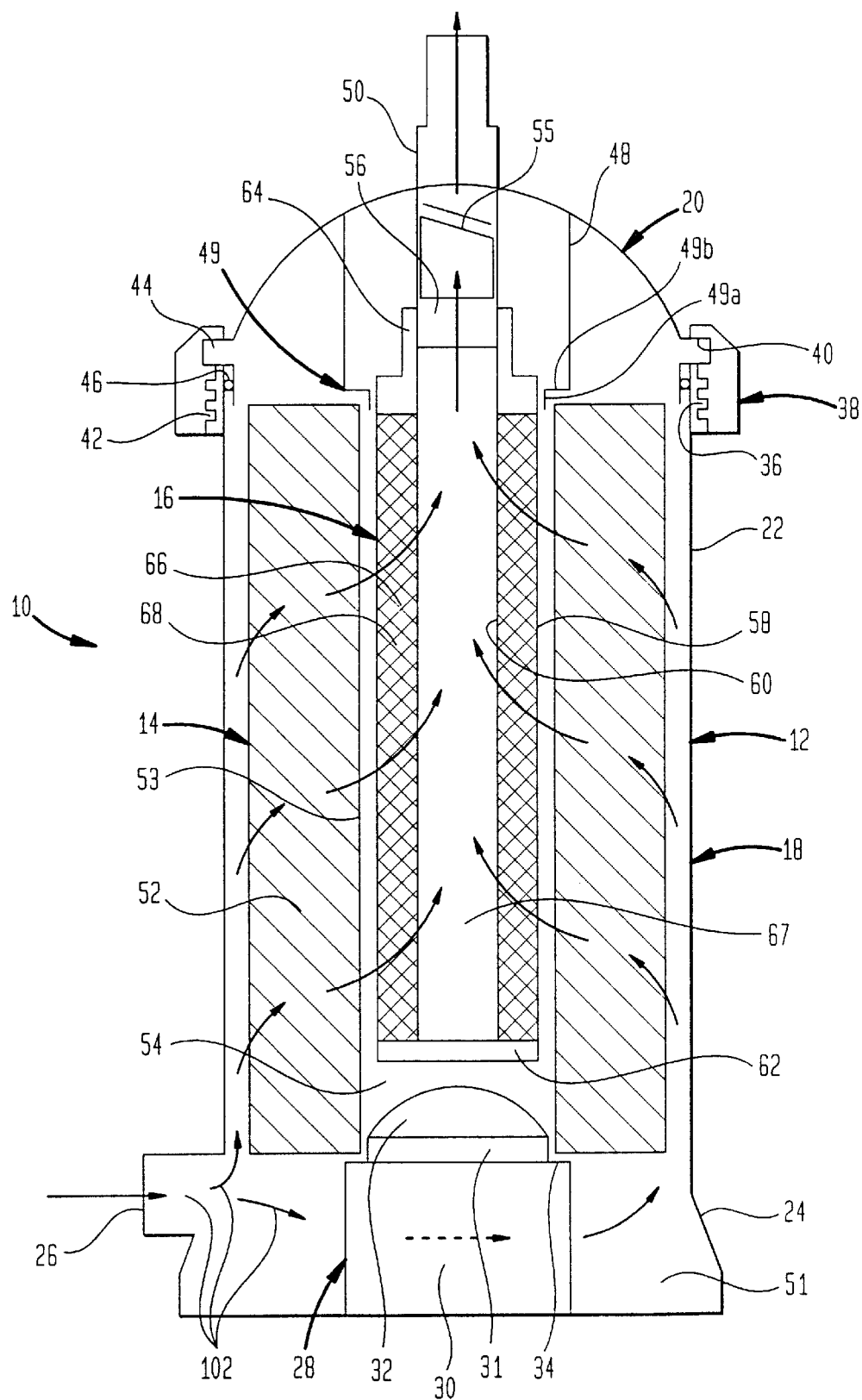
FIG. 1 is a cross-sectional view of a first exemplary embodiment of a filter/sanitizer constructed in accordance with the present invention.
Figure 2:
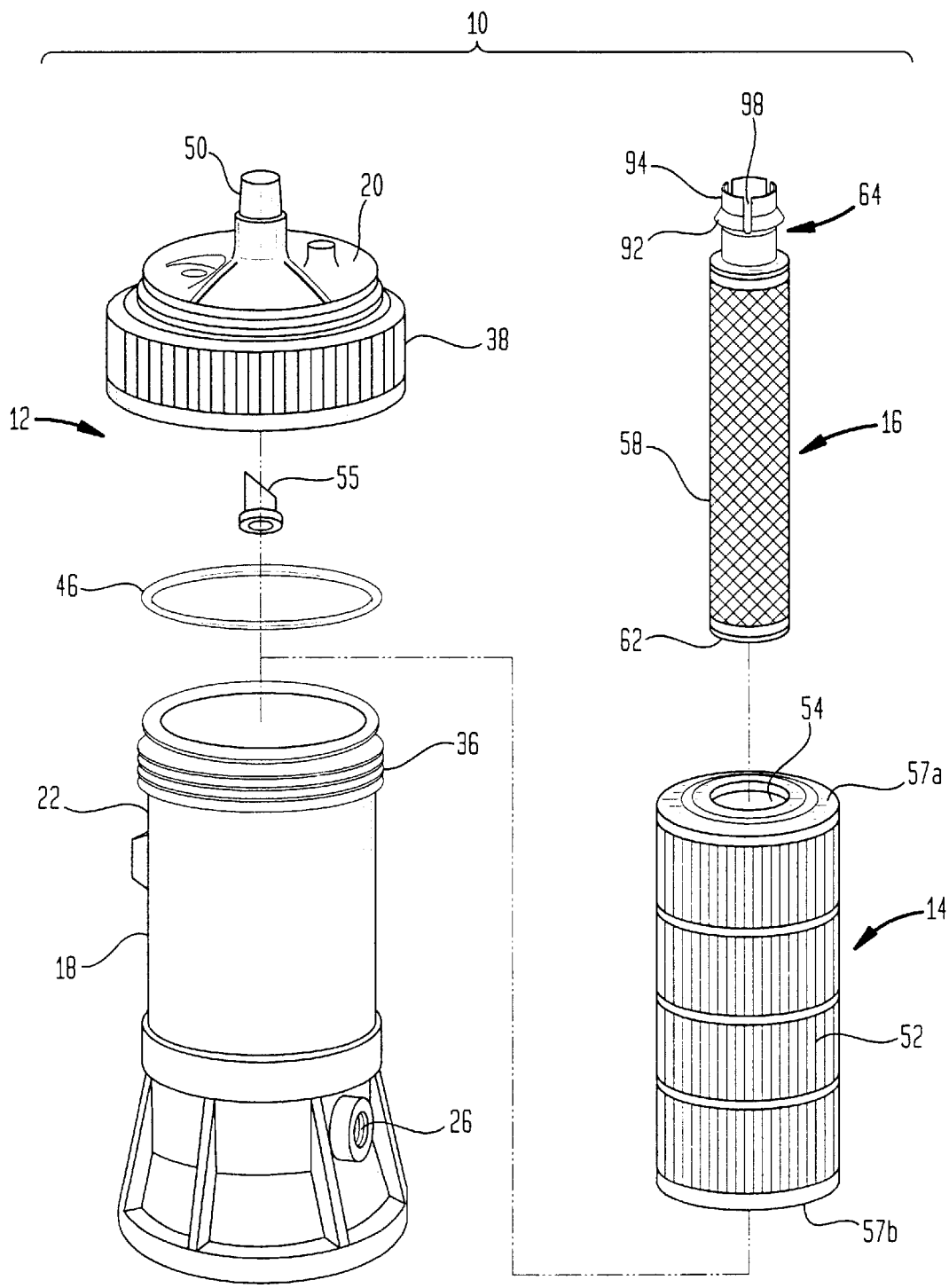
FIG. 2 is an exploded view of the filter/sanitizer shown in FIG. 1.

Referring to FIGS. 1 and 2, there is shown a cartridge-type fluid filter/sanitizer 10 which includes a filter housing 12, a filter cartridge 14 and a sanitizer cartridge 16. Before discussing each in detail, it is noted that the filter housing 12 and the filter cartridge 14 are from a commercially available Hayward model C-550 "EASY-CLEAR" above ground filter. However, it should be understood that the invention is not limited to this particular equipment.

The filter housing 12 includes a filter body 18 and a filter head 20. The filter body 18 has an externally threaded, open, upper end 22 and a filter base 24. The filter base 24 includes a water inlet 26 and a centering post 28. The centering post 28 is integrally molded or glued in the center of the filter base 24. The centering post 28 is a multifunctional part which supports, centers and seals the bottom of the filter cartridge 14 within the filter body 18. The centering post 28 has a cylindrical body 30 with a smaller diameter cylinder 31 with a hemispherical top 32, centered thereupon, forming an annular shoulder 34. The annular shoulder 34 supports the bottom end of the filter cartridge 14. The hemispherical top 32 centers the filter cartridge 14 and provides a close fit between the smaller diameter cylinder 31 of the centering post 28 and the inner diameter of a soft urethane filter cartridge end cap (not shown in FIG. 1), thereby forming a watertight piston seal. The upper end 22 of the filter body 18 has a series of external threads 36 adapted to attach the filter head 20 in a manner to be described hereinafter.

Referring still to FIGS. 1 and 2, the filter head 20 is attached to the filter body 18 with a locking ring 38. The locking ring 38 has a circular groove 40 and a series of internal threads 42. The lower end of the filter head 20 has an annular flange 44 that fits into the groove 40 in the locking ring 38. The internal threads 42 in the locking ring 38 are adapted to threadedly engage the external threads 36 on the filter body upper end 22, thereby forcing the filter head 20 down into the filter body 18. An O-ring 46 is thereby compressed as a piston seal between the filter head 20 and the filter body 18 to provide a fluid-tight seal. The locking ring 38 pulls up on the filter head 20 when unscrewed, thereby breaking the seal between the filter head 20 and the filter body 18.

The filter head 20 also includes a sealing tube 48, with a bottom 49, and an outlet tube 50. The bottom 49 of the sealing tube 48 includes a smaller diameter tube 49a and an annular shoulder 49b. When the filter head 20 is forced down into the filter body 18, the bottom 49 of the sealing tube 48 is forced down into the top of the filter cartridge 14. The annular shoulder 49b of the sealing tube 48 presses the filter cartridge 14 into the centering post 28 in the filter base 24. The filter cartridge 14 forms watertight piston seals between the smaller diameter tube 49a on the bottom 49 of the sealing tube 48 and the top inner diameter of a soft urethane filter cartridge end cap (not shown in FIGS. 1 and 2) and between the bottom inner diameter of a soft urethane filter cartridge end cap (not shown in FIGS. 1 and 2) and the smaller diameter cylinder 31 of the centering post 28. This delineates an outer chamber 51 on the inlet side of the filter cartridge 14 within the filter housing 12. The filter cartridge 14 is a standard Hayward design including a pleated, reinforced, polyester body 52 suspended between urethane end caps (not shown in FIGS. 1 and 2) and a tubular, molded, perforated plastic, center core 53 around a hollow interior 54.

Located in the center of the filter head 20, within the sealing tube 48, is the outlet tube 50. The outlet tube 50 has a check valve 55 positioned inside, approximately at the midpoint of the outlet tube 50. The check valve 55 allows water to flow in one direction only, i.e., out of the filter/sanitizer 10 through the outlet tube 50. The outlet tube 50 also has an internal throat 56. The internal throat 56 of the outlet tube 50 is sealingly and removably attached to the sanitizer cartridge 16 so that substantially all of the water must flow through the sanitizer cartridge 16 before exiting through the outlet tube 50. The removable attachment of the sanitizer cartridge 16 to the filter head 20 allows the filter head 20 and sanitizer cartridge 16 to be handled as a unit for ease of installation and removal.

The disposable sanitizer cartridge 16 includes an outer perforated tube 58 and an inner perforated tube 60, preferably of plastic mesh, but alternatively of metallic mesh. The sanitizer cartridge 16 also includes an end cap 62 and an outlet fitting 64 of plastic, metal or any other suitable material. The perforated tubes 58, 60 are suspended and fixed between the end cap 62 and the outlet fitting 64, forming an annular space 66 between the outer perforated tube 58 and the inner perforated tube 60. While the space 66 is shown as being annular, the space 66 can be of any toroidal shape. The inside of the inner perforated tube 60 is a hollow core 67.

The sanitizer cartridge 16 contains a sanitizing media 68. More particularly, the sanitizing media 68, typically in the form of pellets, tablets or a granular composition, is contained within the annular space 66. The sanitizing media 68 is in a bed in the shape of the space 66. In other words, if the space 66 is toroidal, the sanitizing media 68 will be in a toroidally-shaped bed. The sanitizing media 68 may include any bactericidal, germicidal, algaecidal or other biocidal substances suitable for the particular application. Silver-based bactericides or biocides, which include such things as elemental silver coated or impregnated carriers, divalent silver compositions and trivalent silver compositions, are particularly effective for some water applications. Electrolytic metal compositions, including silver and copper, copper and zinc or any other suitable combination, may also be used. Chlorine based compositions may also be acceptable, as well as any suitable water treatment media.

FIG. 3 is a detail of the end cap 62 of the sanitizer cartridge 16. The end cap 62 includes a thin, solid circular base 70 with two concentric, solid tubes, namely an outer tube 72 and an inner tube 74, affixed to one side. The outer tube 72 has a smaller diameter than the base 70, and forms an annular shoulder 76 around the outside of the base 70. The outer perforated tube 58 rests on the shoulder 76 and is fixed to the base 70 and the outer tube 72 with epoxy or another suitable adhesive. The inner perforated tube 60 is fixed to the base 70 and the inside of the inner tube 74 with epoxy or another suitable adhesive. The end cap 62 effectively seals one end of the sanitizer cartridge 16 so that fluid flow into the hollow core 67 cannot bypass the sanitizing media 68 in the annular space 66.

Figure 6:
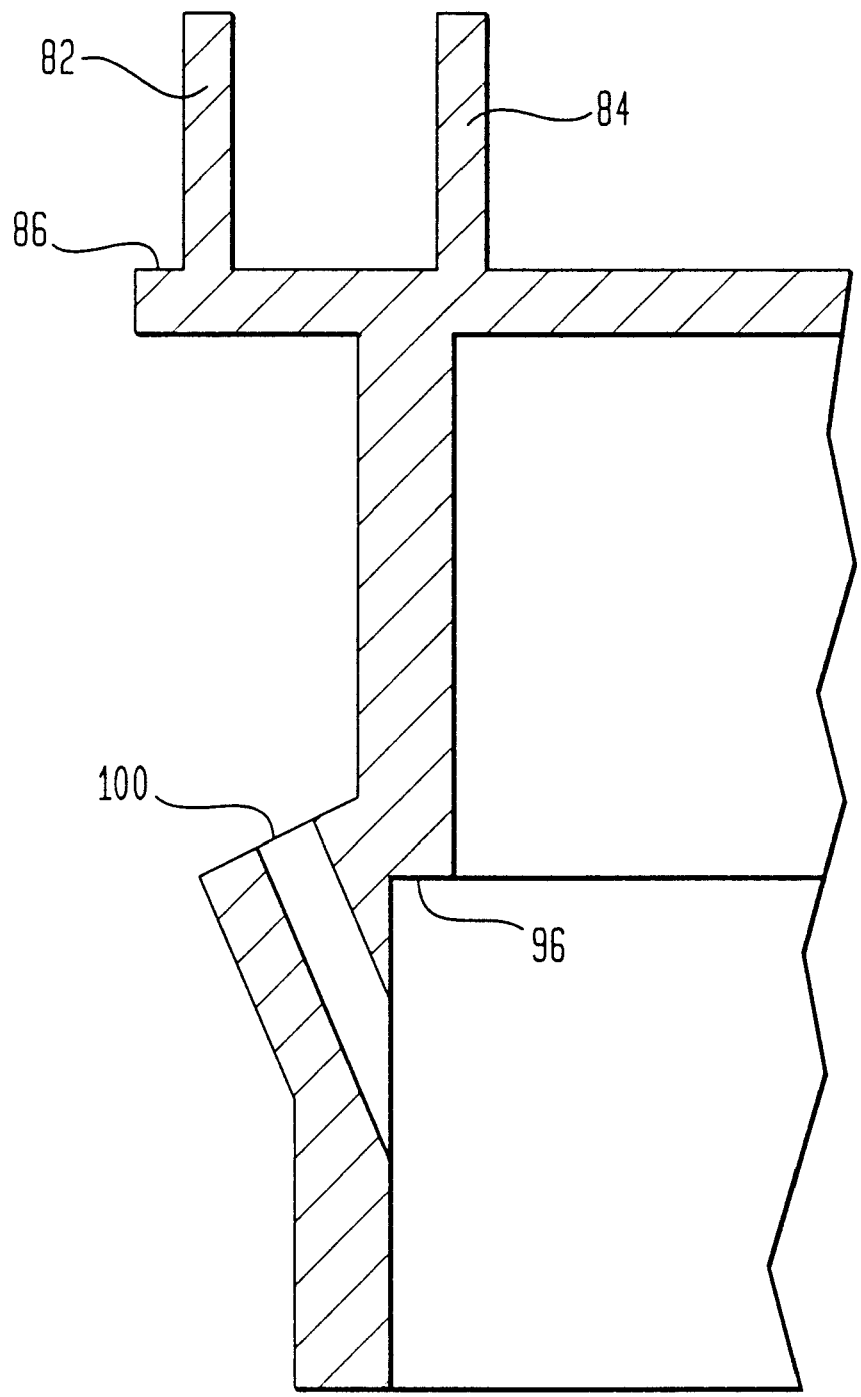
FIG. 6 is a sectional view of the sanitizer cartridge outlet fitting taken along section line A—A in FIG. 5.

The other end of the sanitizer cartridge 16 has an outlet fitting 64. The outlet fitting 64 seals the annular space 66 containing the sanitizing media 68 and sealingly attaches the sanitizer cartridge 16 to the internal throat 56 of the outlet tube 50 in the filter head 20. This arrangement causes substantially all of the fluid flow to pass through the sanitizer cartridge 16 before exiting through the outlet tube 50. With particular reference to FIGS. 4–6, this configuration of the outlet fitting 64 allows retrofitting the sanitizer cartridge 16 to the Hayward model C-550 "EASY-CLEAR" above ground filter. Alternatively, the outlet fitting 64 may have internal threads arranged to engage external threads on the throat 56 of the outlet tube 50.

Referring to FIGS. 4–6, the outlet fitting 64 includes an annular central partition 78 with a centered circular opening 80 that allows water to pass completely through the outlet fitting 64. The outlet fitting 64 also includes two concentric, solid tubes, i.e., an outer tube 82 and an inner tube 84, affixed to one side in the same configuration as the end cap 62 of the sanitizer cartridge 16. The outer tube 82 has a smaller diameter than the central partition 78, and forms an annular shoulder 86 around the outside of the central partition 78. The outer perforated tube 58 rests on the shoulder 86 and is fixed to the central partition 78 and the outer tube 82 with epoxy or another suitable adhesive. The inner perforated tube 60 is fixed to the central partition 78 and the inside of the inner tube 84 of the central partition 78 with epoxy or another suitable adhesive. The connections of the outlet fitting 64 and the end cap 62 to the perforated tubes 58, 60 seal the sanitizing media 68 within the annular space 66 between the perforated tubes 58, 60, completing the sanitizer cartridge 16.

Still referring to FIGS. 4–6, the portion of the outlet fitting 64 below the central partition 78 connects to the throat 56 of the outlet tube 50. Affixed below the central partition 78 is a concentrically centered tube structure 88 with three sections. The first section 90 is tubular. The second section 92 is a tapered annular ring designed to mate with the interior of the filter head 20. The third section 94 is also tubular with an inner diameter greater than the inner diameter of the first section 90. The second section 92 has two inner diameters the same as the inner diameters of the adjacent sections, forming an annular interior shoulder 96 at their junction.

The throat 56 of the outlet tube 50 slidingly seats against the interior shoulder 96. Three slots 98 are cut and positioned equidistantly around the tube structure 88. These slots 98 align with structures in the form of fingers, ribs or the like (not shown) in the filter head 20. The number and orientation of these slots 98 or other openings or protrusions and the corresponding structures in the filter head 20 can be varied to uniquely fit a particular sanitizer cartridge 16 to a uniquely corresponding filter/sanitizer 10.

With reference to FIG. 6, an aperture 100 is provided in the second section 92 of the tubular structure 88. A self-threading screw (not shown) with a length slightly longer than the depth of the aperture 100 is threadedly inserted into the aperture 100. Once the throat 56 of the outlet tube 50 slidingly seats against the interior shoulder 96, the screw is tightened so that it grippingly penetrates the outer surface of the throat 56, thereby holding the sanitizer cartridge 16 in the filter head 20.

In operation, the flow path for the full system flow, as indicated in FIG. 1 by the flow arrows 102, begins at the water inlet 26 into the outer chamber 51 of the filter/sanitizer 10. The cylindrical filter cartridge 14 with the hollow interior 54 is sealingly positioned around the smaller diameter tube 49a on the bottom 49 of the sealing tube 48 in the filter head 20 and the smaller diameter cylinder 31 of the centering post 28 in the filter base 24 such that all of the water flows from the outer chamber 51 through the filter cartridge 14 into its hollow interior 54 towards the outlet tube 50.

The cylindrical sanitizer cartridge 16 with the cylindrical hollow core 67, sealed at one end by the end cap 62, is positioned within the hollow interior 54 of the filter cartridge 14. A clearance between the center core 53 of the filter cartridge 14 and the outer perforated tube 58 of the sanitizer cartridge 16, sufficient for water to circulate, is maintained. By maximizing the diameters of the outer perforated tube 58 and the inner perforated tube 60, the inlet and outlet areas of the sanitizer cartridge 16 are also maximized. This maximization of areas, in conjunction with minimizing the thickness of the layer of sanitizing media 68, enables substantially the full flow of the water through the filter cartridge 14 to pass through the sanitizer cartridge 16 without an excessive pressure drop.

The outlet fitting 64 of the sanitizer cartridge 16 is removably and sealingly attached to the internal throat 56 of the outlet tube 50. Substantially all of the water flows through the sanitizing media 68 in the annular space 66 in the sanitizer cartridge 16, then into its cylindrical hollow core 67 and, finally, out of the filter/sanitizer 10 through the outlet tube 50. Thus, the full flow of water through the filter/sanitizer 10 is both filtered by the filter cartridge 14 and disinfected by the sanitizing media 68 within the sanitizer cartridge 16.

Figure 7:
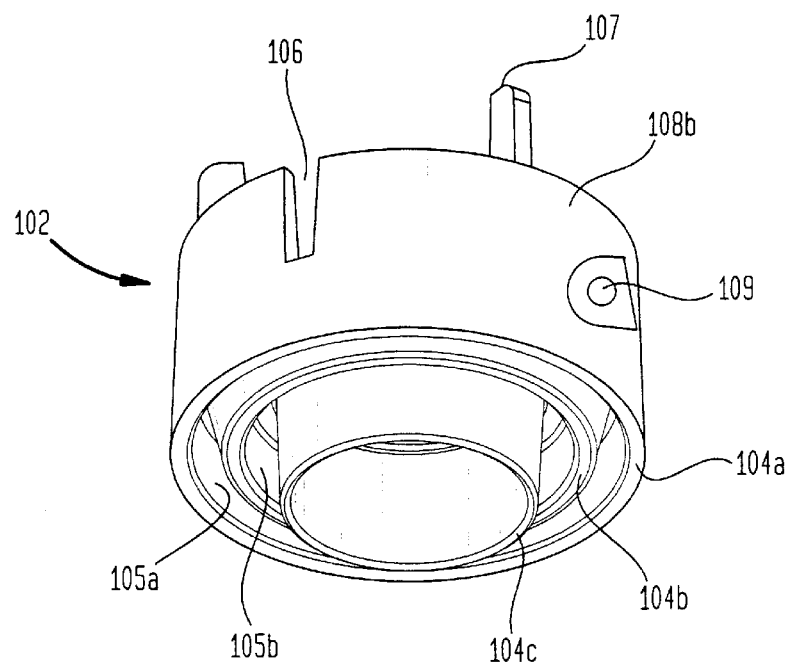
FIG. 7 is a bottom perspective view of an alternate embodiment of the sanitizer cartridge outlet fitting for the filter/sanitizer shown in FIG. 1.
Figure 8:
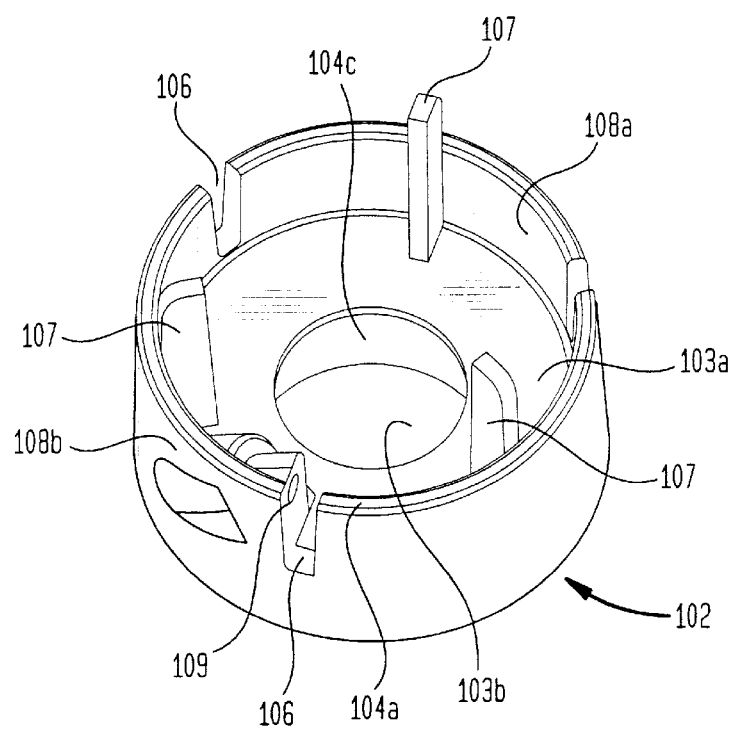
FIG. 8 is a top perspective view of the sanitizer cartridge outlet fitting shown in FIG. 7.

FIGS. 7 and 8 show an alternative embodiment of an outlet fitting 102 for the sanitizer cartridge 16. The outlet fitting 102 includes an annular central partition 103a with a centered circular opening 103b that allows water to pass completely through the outlet fitting 102. The outlet fitting 102 also includes three concentric, solid tubes, i.e., an outer tube 104a, an inner tube 104b, and a flow-through tube 104c. The outer tube 104a surrounds the periphery of the central partition 103a and extends above and below the central partition 103a. The inner tube 104b has a smaller diameter than the outer tube 104a and extends below the central partition 103a. An outer space 105a is formed in between the outer tube 104a and the inner tube 104b. The flow-through tube 104c has a smaller diameter than the inner tube 104b and extends below the central partition 103a, slightly beyond the inner tube 104b and feeds directly into the circular opening 103b. An inner space 105b is formed in between the inner tube 104b and the flow-through tube 104c.

The outer perforated tube 58 rests against the bottom of the central partition 103a and in the outer space 105a, which is only large enough to accommodate the width of the outer perforated tube 58, which is then fixed in place in the outer space 105a with epoxy or another suitable adhesive. The inner perforated tube 60 rests against the bottom of the central partition 103a and in the inner space 105b, which is only large enough to accommodate the width of the inner perforated tube 60, which is then fixed in place in the inner space 105b with epoxy or another suitable adhesive.

Three slots 106 are cut in and positioned equidistantly around the portion of the outer tube 104a that extends above the central partition 103a. These slots 106 align with structures in the form of fingers, ribs, or the like (not shown) in the filter head 20. Three projections 107 are positioned above the central partition 103a, adjacent to an inner surface 108a of the outer tube 104a, and are spaced equidistantly between the three slots 106. These projections 107 are used to center the outlet fitting 102 in the filter head 20.

An aperture 109 is provided in an exterior surface 108b of the outer tube 104a. A self-threading screw (not shown) with a length slightly longer than the depth of the aperture 109 is threadedly inserted into the aperture 109. Once the throat 56 of the outlet tube 50 slidingly seats in between the three projections 107, the screw is tightened so that it grippingly penetrates the structure (not shown) depending from the filter head 20 that is positioned in the slot 106 that is adjacent to the aperture 109.

There are many alternate embodiments (not shown) of the invention that allow all or substantially all the flow through a standard, hollow, cylindrical, filter cartridge 14 to flow through a sanitizer cartridge 16. In alternate embodiments (not shown), the sanitizer cartridge 16 may be refillable in contrast to disposable.

In another alternate embodiment (not shown), the sanitizer cartridge 16 may be combined with the filter cartridge 14 to form a single, unitary filter/sanitizer element. In this embodiment, the outer perforated tube 58 of the sanitizer cartridge 16 would replace the center core 53 of the filter cartridge 14.

In yet another alternate embodiment (not shown), a universal sanitizer cartridge can be configured. A universal sanitizer cartridge includes all of the features of the sanitizer cartridge 16 illustrated and described in FIGS. 1–6 except for the outlet fitting 64. The outlet fitting for the universal sanitizer cartridge would be like the outlet fitting 64 shown in FIG. 4, but without the tubular structure 88. A thin annular gasket (not shown), with an outer diameter larger than the diameter of the sealing tube 48 and less than the outer diameter of the filter cartridge 14 and an inner diameter equal to the diameter of the circular opening 80 in the central partition 78 of the outlet fitting 64, replaces the tubular structure 88. The annular gasket would be attached to the central partition 78 with any suitable adhesive. The universal sanitizer cartridge would be placed into the hollow interior 54 of the filter cartridge 14 so that the annular gasket attached to the central partition 78 of the outlet fitting 64 would extend substantially over the top of the filter cartridge 14. When the filter head 20 is forced down by the locking ring 38, the annular gasket on the outlet fitting would be sealingly compressed between bottom 49 of the sealing tube 48 and the filter cartridge 14. The full flow of water would pass from the outer chamber 51 through the filter cartridge 14 into its hollow interior 54, then through the sanitizing media 68 into the cylindrical hollow core 67 of the universal sanitizer cartridge and, finally, out through the circular opening 80 in the modified outlet fitting 64 and the outlet tube 50.

Figure 9:
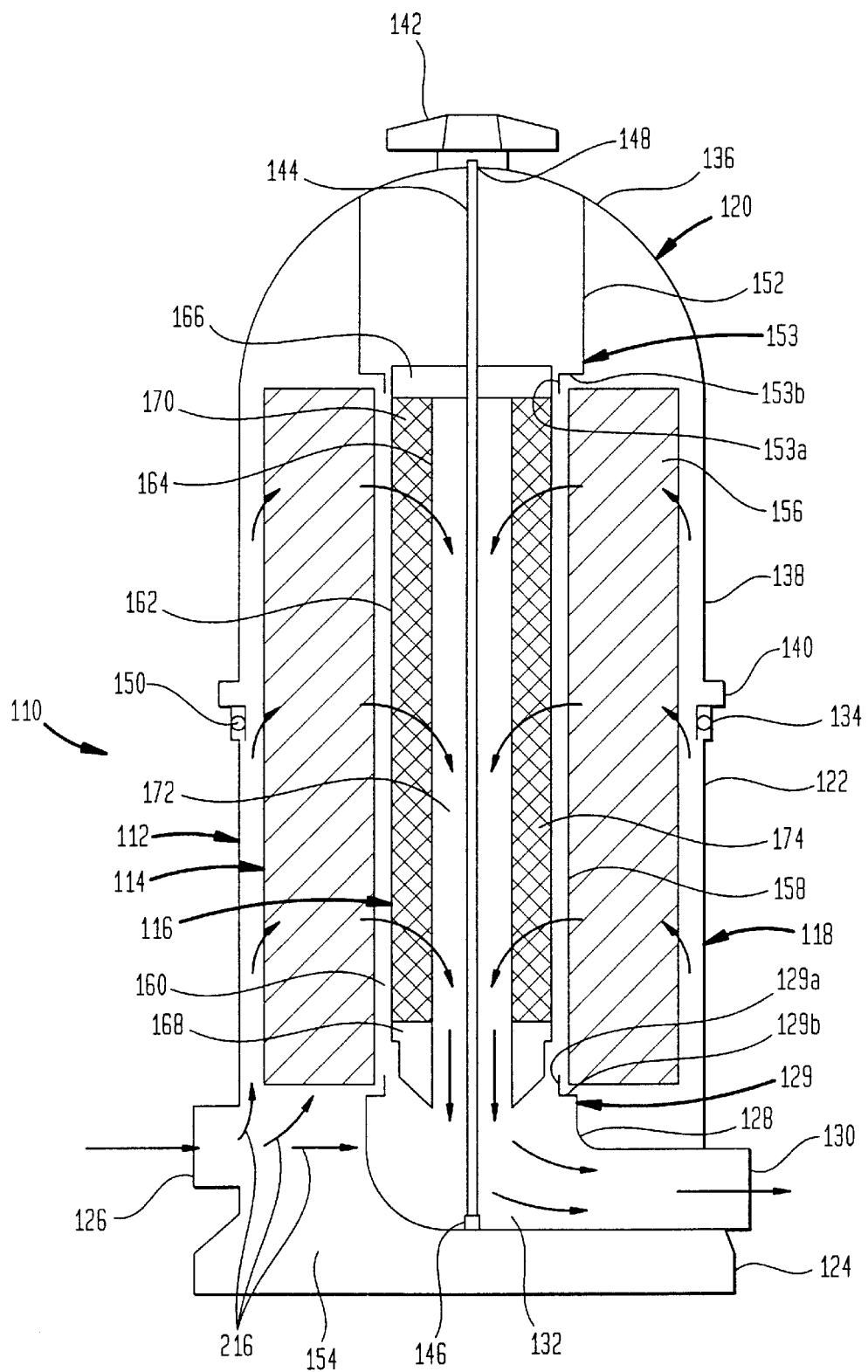
FIG. 9 is a cross-sectional view of a second exemplary embodiment of a filter/sanitizer constructed in accordance with the present invention.
Figure 10:
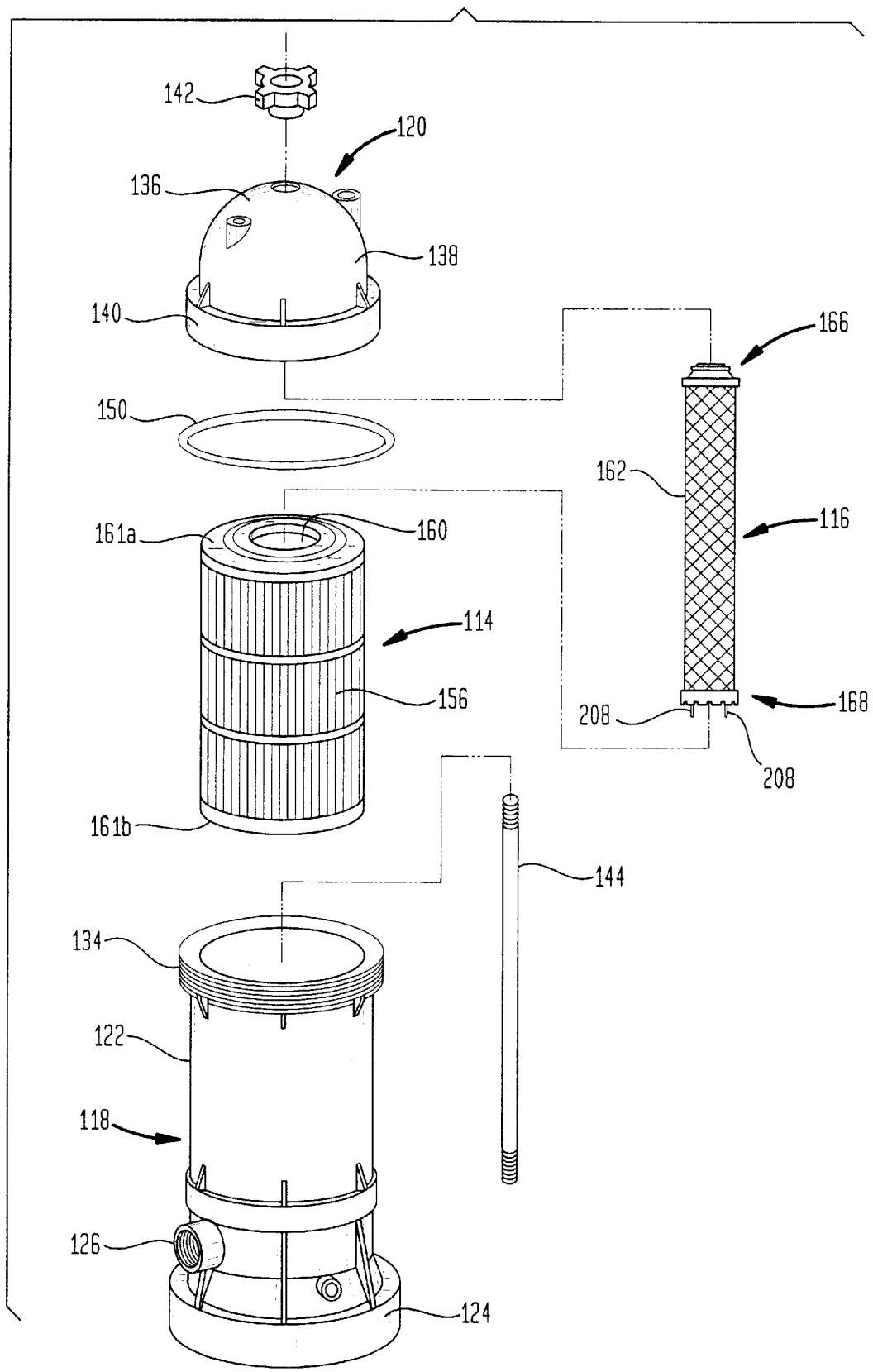
FIG. 10 is an exploded view of the filter/sanitizer shown in FIG. 9.

Referring to FIGS. 9 and 10, in an alternate embodiment of the invention, there is shown a cartridge-type fluid filter/sanitizer 110 which includes a filter housing 112, a filter cartridge 114 and a sanitizer cartridge 116. Before discussing each in detail, it is noted that the filter housing 112 and the filter cartridge 114 are from a commercially available Hayward model C-1200 "STAR-CLEAR PLUS" in-ground filter. However, it should be understood that the invention is not limited to this particular equipment.

The filter housing 112 includes a filter body 118 and a filter head 120. The filter body 118 has an open, upper end 122 and a filter base 124. The filter base 124 includes a water inlet 126, an outlet tube 128, with a top 129, and a water outlet 130. The outlet tube 128 is integrally molded in the center of the filter base 124. The outlet tube 128 is a multifunctional part which supports, centers and seals the bottom of the filter cartridge 114 within the filter body 118. The outlet tube 128 also supports, centers and seals the sanitizer cartridge 116 within the filter body 118. The top 129 of the outlet tube 128 includes a smaller diameter tube 129a and an annular shoulder 129b. The water outlet 130, which is in the form of a horizontal tube, is connected to the outlet tube 128. An outlet chamber 132 is formed by the hollow interiors of the outlet tube 128 and the water outlet 130. The upper end 122 of the filter body 118 has an annular shoulder 134 adapted to support the filter head 120 in a manner to be described hereinafter.

Referring still to FIGS. 9 and 10, the filter head 120 has a domed top 136 and a cylindrical lower end 138 with an annular flange 140. The filter head 120 is attached to the filter body 118 with a locking knob 142 and a threaded rod 144. The threaded rod 144 is threadedly attached to the filter base 124 with a suitable threaded attachment 146. The locking knob 142 has a series of internal threads 148. The internal threads 148 in the locking knob 142 are adapted to threadedly engage the threaded rod 144, thereby forcing the filter head 120 down into the filter body 118. An O-ring 150 is thereby compressed as a piston seal between the filter head 120 and the filter body 118 to provide a fluid-tight seal.

The filter head 120 also includes a sealing tube 152 with a bottom 153. The bottom 153 of the sealing tube 152 includes a smaller diameter tube 153a and an annular shoulder 153b. When the filter head 120 is forced down into the filter body 118, the bottom 153 of the sealing tube 152 is forced down into the top of the filter cartridge 114. The annular shoulder 153b of the sealing tube 152 presses the filter cartridge 114 into the outlet tube 128 in the filter base 124. The filter cartridge 114 forms watertight piston seals between the smaller diameter tube 153a on the bottom 153 of the sealing tube 152 and the top inner diameter of a soft urethane filter cartridge end cap (not shown in FIGS. 9 and 10) and between the bottom inner diameter of a soft urethane filter cartridge end cap (not shown in FIGS. 9 and 10) and the smaller diameter tube 129a on the top 129 of the outlet tube 128. This delineates an outer chamber 154 on the inlet side of the filter cartridge 114 within the filter housing 112. The filter cartridge 114 is a standard Hayward design including a pleated, reinforced, polyester body 156 suspended between urethane end caps (not shown in FIGS. 9 and 10) and a tubular, molded, perforated plastic, center core 158 around a hollow interior 160.

The disposable sanitizer cartridge 116 is positioned within the hollow interior 160 of the filter cartridge 114 (see FIG. 10). The sanitizer cartridge 116 includes an outer perforated tube 162 and an inner perforated tube 164, preferably of plastic mesh, but alternatively of metallic mesh. The sanitizer cartridge 116 also includes an end cap 166 and an outlet fitting 168 of plastic, metal or any other suitable material. The perforated tubes 162, 164 are suspended and fixed between the end cap 166 and the outlet fitting 168, forming an annular space 170 between the outer perforated tube 162 and the inner perforated tube 164. The inside of the inner perforated tube 164 is a hollow core 172.

The sanitizer cartridge 116 contains a sanitizing media 174. The sanitizing media 174, typically in the form of pellets, tablets or a granular composition, is contained within the annular space 170. The sanitizing media 174 may include any bactericidal, germicidal, algaecidal or other biocidal substances suitable for the particular application. Silver-based bactericides or biocides, which include such things as elemental silver coated or impregnated carriers, divalent silver compositions and trivalent silver compositions, are particularly effective for some water applications. Electrolytic metal compositions, including silver and copper, copper and zinc or any other suitable combination, may also be used. Chlorine based compositions may also be acceptable, as well as any suitable water treatment media.

Figure 11:
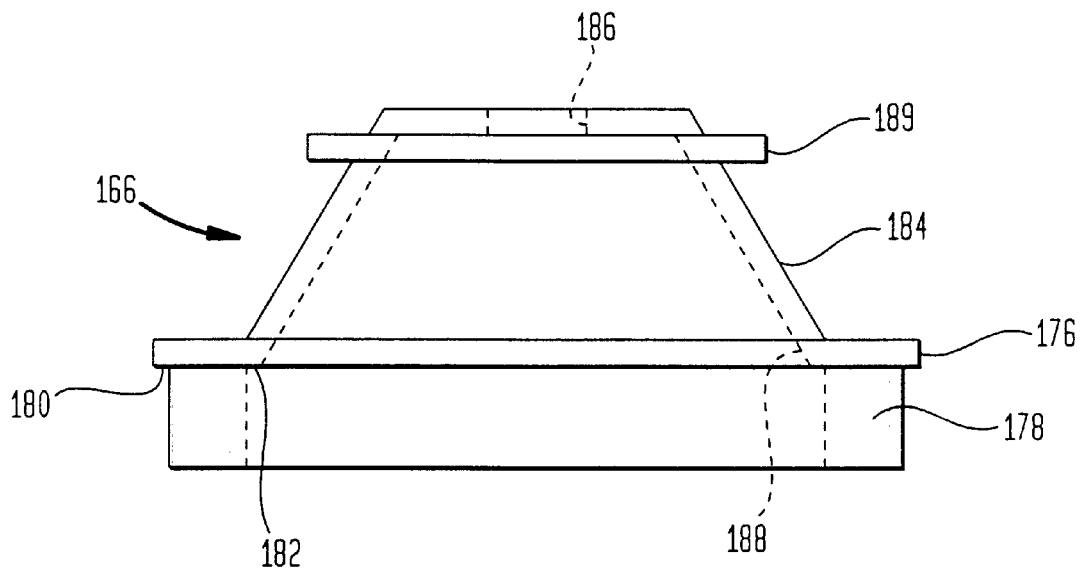
FIG. 11 is an elevation of the sanitizer cartridge end cap for the filter/sanitizer shown in FIG.9.
Figure 12:
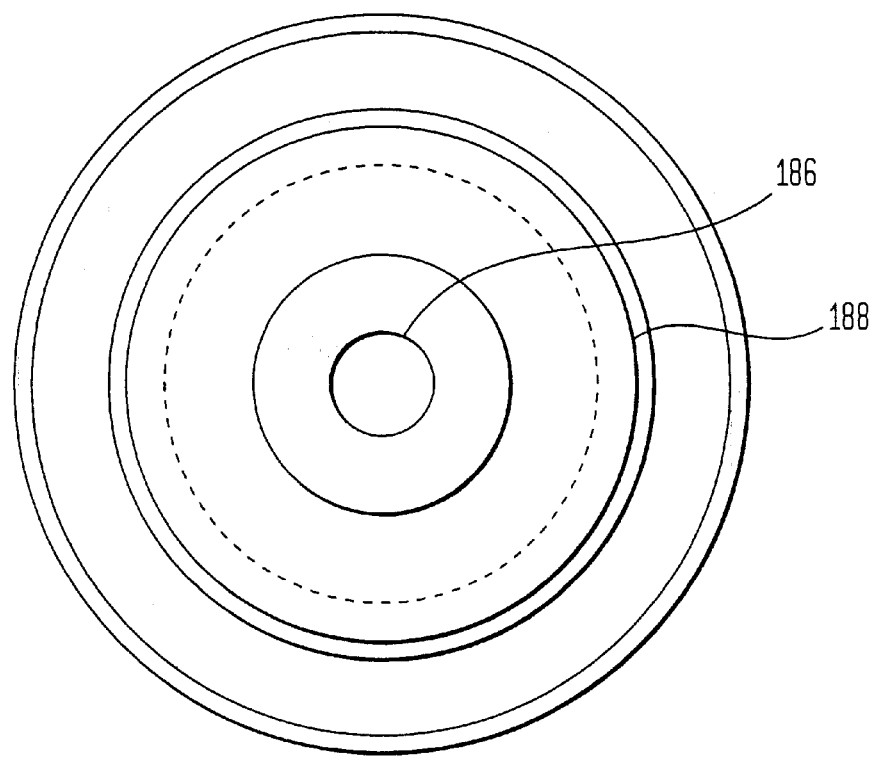
FIG. 12 is a bottom plan view of the sanitizer cartridge end cap shown in FIG. 11.

Referring to FIGS. 11 and 12, end cap 166 of the sanitizer cartridge 116 includes an annular partition 176 with a concentric, solid tube 178 affixed to one side. The tube 178 has an outer diameter less than the outer diameter of the partition 176, and forms an outer annular shoulder 180 around the outside of the partition 176. The outer perforated tube 162 rests on the outer annular shoulder 180 and is fixed to the partition 176 and the outside of tube 178 with epoxy or another suitable adhesive. The tube 178 has an inner diameter greater than the inner diameter of the partition 176 and forms an inner annular shoulder 182 around the inside of the partition 176. The inner perforated tube 164 rests on the inner annular shoulder 182 and is fixed to the partition 176 and the inside of the tube 178 with epoxy or another suitable adhesive.

Still referring to FIGS. 11 and 12, the portion of the end cap 166 above the partition 176 includes a hollow frustum 184 with a small circular opening 186 in the top of the frustum 184 and a large circular opening 188 in the bottom of the frustum 184. The circular openings 186, 188 allow the threaded rod 144 to pass through the end cap 166. The diameter of the opening 186 is only slightly larger than the diameter of the threaded rod 144 to minimize fluid bypass from the hollow interior 160 of the filter cartridge 114 to the hollow core 172 of the sanitizer cartridge 116 through the circular openings 186, 188. An external flange 189 is positioned just below the top of the hollow frustum 184. The flange 189 functions as a handle to lift the sanitizer cartridge 116.

Figure 13:
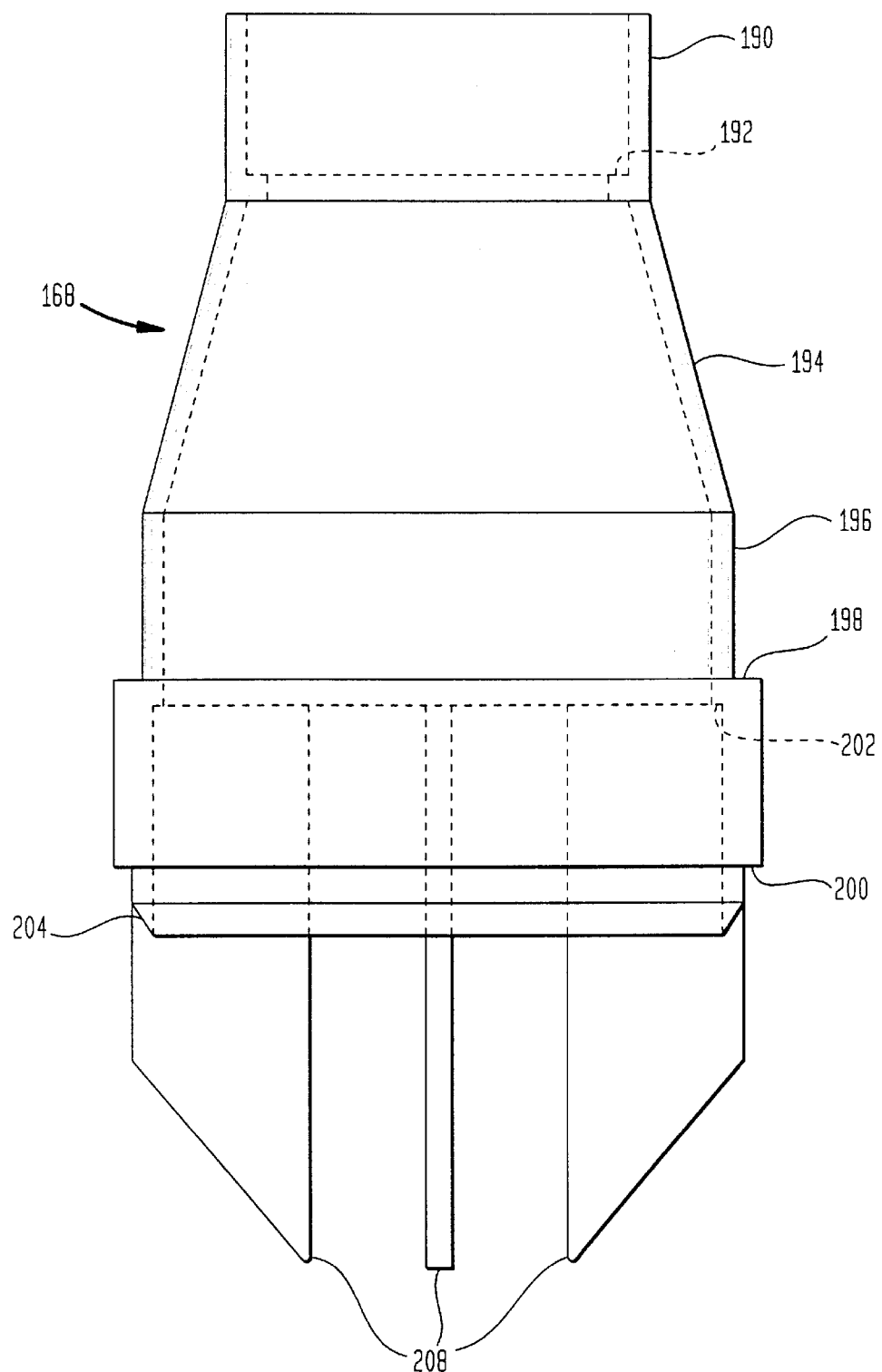
FIG. 13 is an elevation of the sanitizer cartridge outlet fitting for the filter/sanitizer shown in FIG. 9.
Figure 14:
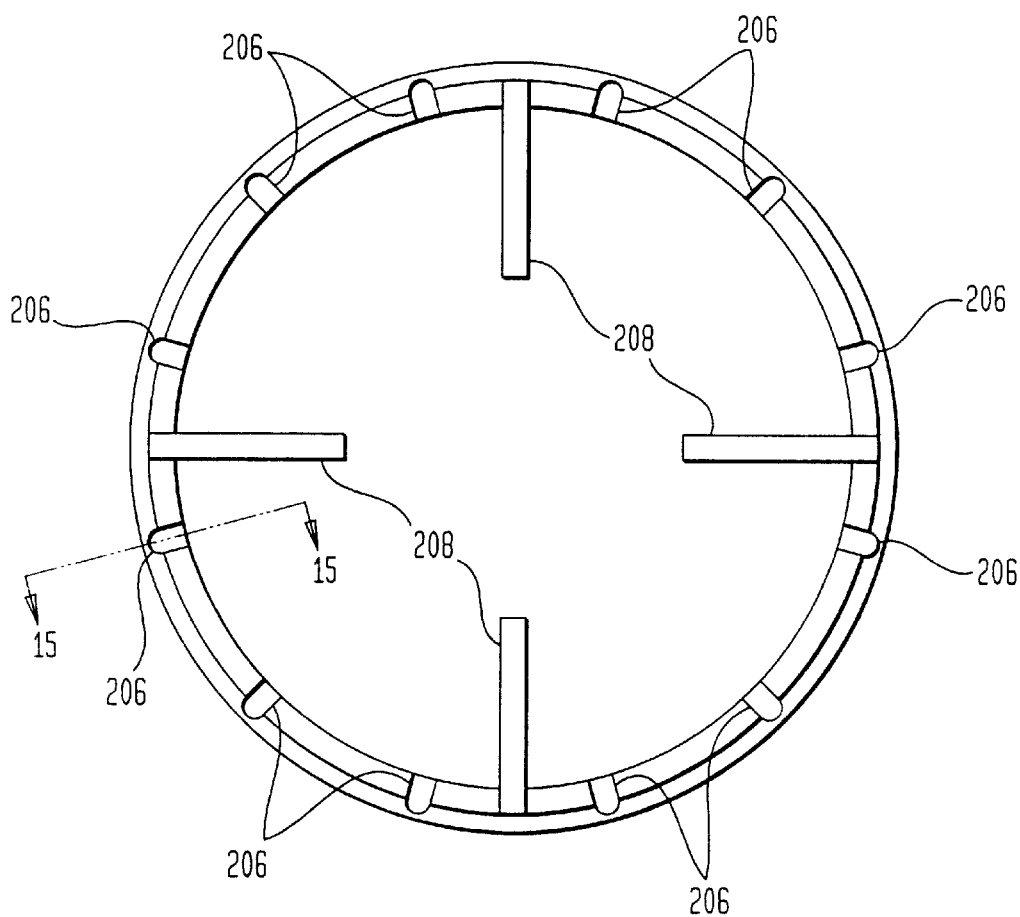
FIG. 14 is a bottom plan view of the sanitizer cartridge outlet fitting shown in FIG. 13.
Figure 15:
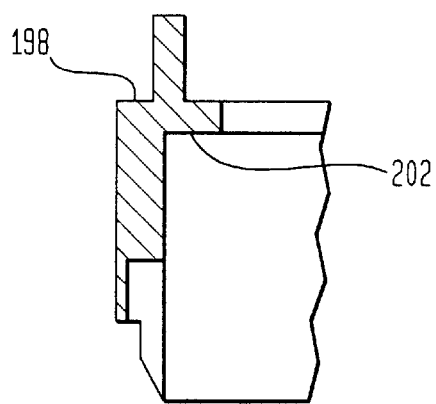
FIG. 15 is a cross-sectional view taken along section line A—A in FIG. 14.

The other end of the sanitizer cartridge 116 has a tubular outlet fitting 168. The outlet fitting 168 seals the annular space 170 containing the sanitizing media 174 and sealingly seats the sanitizer cartridge 116 in the outlet tube 128 in the filter base 124. This arrangement causes substantially all of the fluid flow to pass through the sanitizer cartridge 116 before exiting through the outlet tube 128. With particular reference to FIGS. 13–15, this configuration of the outlet fitting 168 allows retrofitting the sanitizer cartridge 116 to the Hayward model C-1200 "STAR-CLEAR PLUS" in-ground filter.

Referring to FIGS. 13–15, the outlet fitting 168 includes three sections. The top section 190 is tubular with an internal, annular shoulder 192. The middle section 194 is a tubular frustum with a larger diameter bottom. The bottom section 196, which is also tubular, includes three annular shoulders; namely, an external, upper shoulder 198, an external, lower shoulder 200 and an internal shoulder 202. A chamfer 204 is included around the lower end of the bottom section 196.

Twelve identical notches 206 are symmetrically spaced about the lower end of the bottom section 196. Also attached to the lower end of the bottom section 196 are four identical tapered fingers 208. The tapered fingers 208 are spaced at 90° intervals, equidistantly between adjacent notches 206 (see FIG. 14). These notches 206 align with structures in the form of fingers, ribs or the like (not shown) in the filter base 124. The number and orientation of these notches 206 or other openings or protrusions and the corresponding structures in the filter base 124 can be varied to uniquely fit a particular sanitizer cartridge 116 to a uniquely corresponding filter/sanitizer 110.

Figure 16:
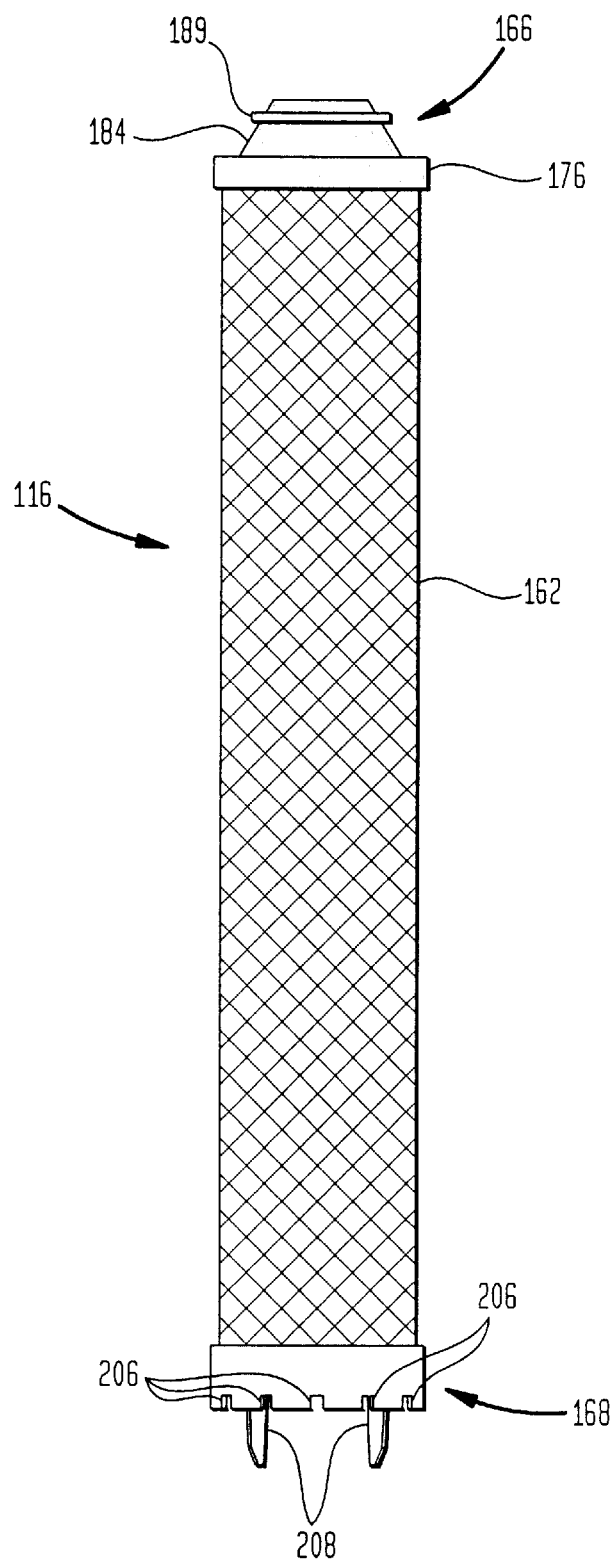
FIG. 16 is a side view of the sanitizer cartridge for the filter/sanitizer shown in FIG. 9.

Referring now to FIG. 13, the inner perforated tube 164 slides into the top section 190 of the outlet fitting 168, rests upon the annular shoulder 192 and is fixed inside the top section 190 with epoxy or another suitable adhesive. The outer perforated tube 162 slides around the top of the bottom section 196 and rests on the external, upper shoulder 198. The outer perforated tube 162 is also fixed to the bottom section 196 with epoxy or another suitable adhesive. The connections of the outlet fitting 168 and the end cap 166 to the perforated tubes 162, 164 seal the sanitizing media 174 within the annular space 170 between the perforated tubes 162, 164 completing the sanitizer cartridge 116 (see FIG. 16). When the sanitizer cartridge 116 is positioned inside the hollow interior 160 of the filter cartridge 114 within the filter body 118, the external lower shoulder 200 of the outlet fitting 168 sealingly rests on the smaller diameter tube 129a at the top 129 of the outlet tube 128.

Figure 17:
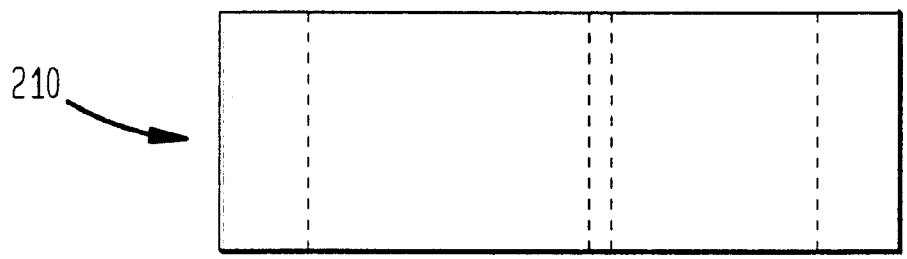
FIG. 17 is an elevation of the restraining tab for the filter/sanitizer shown in FIG. 9.
Figure 18:
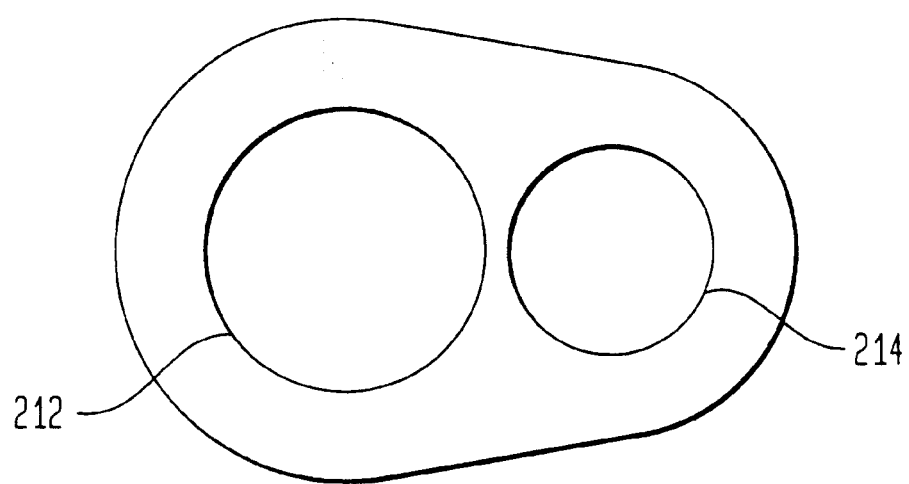
FIG. 18 is a top plan view of the restraining tab shown in FIG. 17.

Referring to FIGS. 17 and 18, a restraining tab 210 has a large diameter aperture 212 and small diameter aperture 214. The large diameter aperture 212 is placed over the threaded rod 144. The small diameter aperture 214 is placed over the lower end of an air hose (not shown). The restraining tab 210 is positioned as near to the bottom of the outlet tube 128 as possible. The top end of the air hose (not shown) is located in the hollow frustum 184 of the end cap 166 of the sanitizer cartridge 116. The purpose of the air hose (not shown) is to prevent the accumulation of air in the filter head 120 during operation of the filter/sanitizer 110.

In operation, the flow through the filter/sanitizer 110, indicated in FIG. 9 by the flow arrows 216, begins at the water inlet 126 into the outer chamber 154. The cylindrical filter cartridge 114 with the hollow interior 160 is sealingly positioned around the smaller diameter tube 153a on the bottom 153 of the sealing tube 152 in the filter head 120 and the smaller diameter tube 129a on the top 129 of the outlet tube 128 in the filter base 124 such that all of the water flows from the outer chamber 154 through the filter cartridge 114 into its hollow interior 160 towards the water outlet 130.

The cylindrical sanitizer cartridge 116 is positioned within the hollow interior 160 of the filter cartridge 114. The threaded rod 144 passes through the outlet fitting 168, hollow core 172 and the small circular opening 186 in the top of the end cap 166, centering the sanitizer cartridge 116 within the filter body 118. A clearance between the center core 158 of the filter cartridge 114 and the outer perforated tube 162 of the sanitizer cartridge 116, sufficient for water to circulate, is maintained. By maximizing the diameters of the outer perforated tube 162 and the inner perforated tube 164, the inlet and outlet areas of the sanitizer cartridge 116 are also maximized. This maximization of areas, in conjunction with minimizing the thickness of the layer of sanitizing media 174, enables substantially the full flow of the water through the filter cartridge 114 to pass through the sanitizer cartridge 116 without an excessive pressure drop.

The outlet fitting 168 of the sanitizer cartridge 116 is removably and sealingly positioned in the outlet tube 128. Substantially all of the water flows through the sanitizing media 174 in the annular space 170 within the sanitizer cartridge 116, then into its cylindrical hollow core 172 and, finally, out of the filter/sanitizer 110 through the outlet tube 128 and the water outlet 130. Thus, the full flow of water through the filter/sanitizer 110 is both filtered by the filter cartridge 114 and disinfected by the sanitizing media 174 within the sanitizer cartridge 116.

There are many alternate embodiments (not shown) of the invention that allow all or substantially all the flow through a standard, hollow, cylindrical, filter cartridge 114 to flow through a sanitizer cartridge 116. In alternate embodiments (not shown), the sanitizer cartridge may be refillable in contrast to disposable.

In another alternate embodiment (not shown), the sanitizer cartridge 116 may be combined with the filter cartridge 114 to form a single, unitary filter/sanitizer element. In this embodiment, the outer perforated tube 162 of the sanitizer cartridge 116 would replace the center core 158 of the filter cartridge 114.

It should be noted that the embodiments described herein are merely exemplary and that a person skilled in the art may make many variations and modifications without departing from the spirit and scope of the invention. For instance, the embodiments disclosed may be adapted for any water treatment application with any suitable water treatment media. In addition, the present invention can be used to filter and chemically treat liquids other than water, as well as gaseous fluids. All such variations and modifications are intended to be included within the scope of the invention as defined in the appended claims.

I claim:

1. A method of sanitizing water in a bathing pool comprising the steps of:
   providing a system flow of pool water to be filtered and sanitized;
   filtering the system flow of pool water;
   passing substantially a flow of pool water filtered in the prior step through a sanitizing media contained within a sanitizer cartridge without a pressure drop that would significantly interrupt said steps of providing the system flow of pool water and filtering the system flow of pool water, said sanitizer cartridge including an outer fluid permeable member, an inner fluid-permeable member which cooperates with said outer fluid-permeable member to define a toroidally-shaped space therebetween, said sanitizing media contained within said toroidally-shaped space in a toroidally-shaped bed, and a hollow core bounded by said inner fluid-permeable member; and
   allowing said full flow of pool water passed through said sanitizing media to pass from said hollow core of said sanitizer cartridge into the pool after being filtered and sanitized.

2. The method of claim 1, wherein said step of filtering includes providing said system flow of pool water to an inlet of a cartridge filter having a pleated filter cartridge contained therein, said pleated filter cartridge having a tubular plastic core with a plurality of perforations therein, and further including the steps of:

opening said cartridge filter to gain access to said pleated filter cartridge;

inserting said sanitizing cartridge into said tubular core of said filter cartridge;

sealingly connecting said sanitizer cartridge to an outlet of said cartridge filter; and closing said filter, all before said step of providing said system flow.

3. The method of claim 2, wherein said step of filtering includes directing substantially the full system flow of pool water through said filter cartridge, through said perforations in said tubular core to a hollow interior thereof before said step of passing the full system flow of pool water through said sanitizing media.

\* \* \* \* \*